United States Patent
Printezis et al.

(12) 
(10) Patent No.: US 6,249,793 B1
(45) Date of Patent: Jun. 19, 2001

(54) MOSTLY CONCURRENT COMPACTION IN A GARBAGE COLLECTION SYSTEM

(75) Inventors: Antonios Printezis, Glasgow (GB); David L. Detlefs, Westford, MA (US)

(73) Assignee: Sun Microsystems, Inc., Palo Alto, CA (US)

(*) Notice: Subject to any disclaimer, the term of this patent is extended or adjusted under 35 U.S.C. 154(b) by 0 days.

(21) Appl. No.: 09/329,908

(22) Filed: Jun. 10, 1999

(51) Int. Cl.[7] .................................................. G06F 17/30
(52) U.S. Cl. ............................................ 707/206; 707/205
(58) Field of Search .................................. 707/206, 205; 395/705

(56) References Cited

U.S. PATENT DOCUMENTS

| | | | |
|---|---|---|---|
| 5,293,614 | * 3/1994 | Ferguson et al. | 707/206 |
| 5,485,613 | 1/1996 | Engelstad et al. | 395/650 |
| 5,900,001 | 5/1999 | Wolczko et al. | 707/206 |
| 5,903,900 | 5/1999 | Knippel et al. | 707/206 |
| 5,911,144 | 6/1999 | Schwartz et al. | 707/206 |
| 5,920,876 | * 7/1999 | Ungar et al. | 707/206 |
| 6,049,810 | * 4/2000 | Schwartz et al. | 707/206 |
| 6,081,665 | * 6/2000 | Nilsen et al. | 395/705 |

OTHER PUBLICATIONS

Jones et al., "Garbage Collection: Algorithms for Automatic Dynamic Memory Management", John wiley & sons Ltd, 1996, pp. 75–81, 97116, 131–151, 175–176, 189–195, 200–202, 222–251, 1996.*

Harbaugh et al., "HeapGuard, eliminating garbage collection in real–time Ada systems", IEEE 1991, pp. 704–708, 1991.*

Yamamoto et al., "Distributed Persistent Object System with Uniform Representation of Pointers and Its Garbage Collection", IEEE 1996, pp. 12–21, 1996.*

* cited by examiner

Primary Examiner—Wayne Amsbury
Assistant Examiner—Thuy Pardo
(74) Attorney, Agent, or Firm—Weingarten, Schurgin, Gagnebin & Hayes LLP (57) ABSTRACT

A system for mostly concurrent compaction in a garbage collection system is disclosed. Objects that have been allocated to a program are relocated by first identifying those variables pointing to a selected set of objects that are in use within a subset of memory. As these pointers are identified, they are added to a data structure. The selection of the objects, identification of the pointers, and addition of the pointers to the data structure may all be performed concurrently with execution of the program. At the same time, a write barrier marks as "dirty" those memory regions in which one or more pointers are modified by the program. A number of locations outside the subset of memory are reserved to be used to store the selected objects. Execution of the program is then suspended. The memory regions marked as "dirty" are examined to identify any further variables pointing to the selected objects. Any such identified variables are added to the data structure. Those variables contained in the data structure that continue to point to the selected objects are modified to point to corresponding locations outside of the subset of memory. The selected set of objects is then copied to the locations outside of the subset of memory, the subset of memory is returned to the free list, and the program is restarted.

44 Claims, 9 Drawing Sheets

MOSTLY CONCURRENT COMPACTION IN A GARBAGE COLLECTION SYSTEM

CROSS REFERENCE TO RELATED APPLICATIONS

Not Applicable

STATEMENT REGARDING FEDERALLY SPONSORED RESEARCH OR DEVELOPMENT

Not Applicable

BACKGROUND OF THE INVENTION

Computer programming systems typically allow programs to allocate data structures on demand, according to the control flow of the program. For example, a mouse click might cause a spreadsheet program to allocate memory for a new bar chart. Such data structures are referred to as "dynamic" data structures, since it is impossible to determine statically how much memory they will require, or for how long they will use any particular memory portion. To support such dynamic data structures, operating systems and/or programming language run-time systems provide mechanisms for dynamically allocating memory. In some systems, management of dynamically allocated memory is left entirely to the programmer. For example, in the C programming language, the malloc function allocates memory, and the free( ) function makes it available for reuse. In C++ the "new" and "delete" operators have the same effect. Both of these languages typically require the program to explicitly deallocate dynamically allocated memory. This approach requires the programmer to indicate what memory to deallocate and when to deallocate it. In complicated programs, it is very difficult for the programmer to do this correctly. Incorrect deallocation of memory may result in a "memory leak" when a portion of memory is not deallocated before the program over-writes the last pointer to it. When this occurs, the memory cannot be deallocated. In addition, a "pointer smash" may result when a program frees a portion of memory while that memory is still in use by another part of the program.

Because of such problems, many modern programming languages include run-time environments in which an independent software component reclaims memory that is no longer in use. The reclaimed memory may then be reallocated as needed. Such run-time components are known as "garbage collectors". While a garbage collector relieves the programmer of the task of explicitly deallocating memory, executing the garbage collector can have a detrimental effect on system "latency", by halting the program. In some existing systems, execution of the garbage collector often results in the program being halted for undesirable or unacceptable periods of time. This is a particular problem for programs that are interactive applications, since such halting is directly perceived by the user.

A number of garbage collection algorithms have been proposed and tried over the years. Three commonly used approaches are "reference counting", "mark and sweep", and "copying". Reference counting garbage collectors maintain a counter for each allocated memory object. In this document, a memory object refers to a portion of memory with a well-defined type, size, and structure, e.g. variables of struct type in C, variables of record type in Pascal, or instances in the Java™ programming environment. Java is a trademark or registered trademark of Sun Microsystems, Inc. in the United States and other countries. The value of the counter reflects the number of existing references to the memory object. When the reference counter for a memory object drops to zero, the memory may be returned to a free pool for subsequent reuse. Reference counting provides some relief from performance degradation by imposing a steady overhead based on reference modifications. However, basic reference counting fails to detect circular references (also referred to as "reference cycles"). For example, where a reference A points to reference B, and B points to reference A, but nothing else points to either A or B, neither A nor B will be freed even though they could be. In addition, reference counts must be accessed atomically in a multi-threaded environment, thus introducing substantial overhead associated with each reference count modification.

The "mark and sweep" approach to garbage collection involves distinct steps of 1) marking memory objects that are referenced by existing variables, and 2) "sweeping" everything that is not marked into a free-list. For example, in an execution environment where memory objects are dynamically allocated from a memory heap, marking may be accomplished by finding every object that is currently reachable from the set of currently existing global and local variables, which are referred to as the "root" variables. Such marking involves initially marking everything in the root set, then marking all memory objects referred to by the roots, and continuing recursively until each object reachable from the roots is marked. The sweep phase then returns all unmarked memory objects to the free list. A simple mark and sweep garbage collector must suspend the executing program while it performs both the marking and sweeping phases.

Traditional "copying" garbage collectors also operate by stopping the program during garbage collection. In such systems the heap is divided into two parts, a "current" part and a "new" part. The garbage collector copies all currently referenced memory objects from the current part of the heap into the new part, thus making the current part into contiguous free space. The new part is then made current. While stop and copy provides good compaction each time it runs, it effectively requires twice the memory of other systems. It also suspends program execution for relatively long periods, which is not acceptable in many cases.

The inability to operate concurrently with program execution often results in unacceptable program delays. Accordingly, some attempts have been made to shorten the time during which the program must be stalled. In what is referred to as a "generational" garbage collector, the memory heap is divided into a "young generation" of recently allocated objects, and a much larger "old generation" of older allocated objects. Because the objects in the young generation are more likely to be collectable than those in the old generation, periodic collection of the young generation reclaims significant amounts of memory storage. Because only a relatively small portion of the memory heap is examined, the program is suspended for a much shorter time than is the case where the whole memory heap is garbage collected at once. However, at some point, the larger old generation of allocated objects must inevitably be garbage collected, potentially causing the program to be paused for long periods.

In "mostly parallel" mark and sweep collection schemes, the basic mark and sweep algorithm is modified such that the program is stopped initially only while those objects directly reachable from the roots are marked. The program is then restarted and the objects indirectly reachable from the roots are marked concurrently with program execution. Such a concurrent marking phase is not guaranteed to mark all reachable objects. For example, a situation may arise where an object Obj1 originally contains a pointer to an object Obj3, and an object Obj2 contains a pointer to an object Obj4. At a first point in time, the marking process reaches and marks Obj1. The marking process then discovers the pointer to Obj3, and recursively marks that object. Before the marking process reaches Obj2, however, the program could potentially swap the pointers in Obj1 and Obj2, such that Obj1 points to the unmarked object Obj4 and Obj2 points to the marked object Obj3. When the marking process eventually reaches Obj2, it will find that it points to an object that is already marked (Obj3), and do no further work. The reachable object Obj4 would not be marked.

To avoid this problem, the mostly parallel scheme arranges to keep track of all reference variables that have been modified since the beginning of the current marking phase. These "dirty" variables hold references that might have been missed by the original marking phase. Thus, when the concurrent marking phase has finished, the program is again suspended, and marking is redone from the roots as well as from any other objects that have been marked as "dirty". This guarantees that all objects reachable at the end of the marking phase are marked. The program may then resume execution while the garbage collector performs the sweep phase concurrently. However, this "mostly parallel" mark and sweep approach does not allow allocated objects to be relocated. Accordingly, it does not permit compaction of the memory heap, which will gradually become fragmented such that available memory is divided into many small segments. As a result, it may become prohibitively expensive or impossible to satisfy a large allocation request, even when the total amount of free space is significantly larger than the request size. Relocation of objects in this type of system is difficult to perform because other objects and/or roots may point to the relocated object. Any modifications to these pointers must be done atomically with respect to the program. Otherwise, if the program is allowed to modify variables while references to relocated objects are being updated, the updating process may fail to identify some variables that require updating.

Thus for the reasons stated above, it would be desirable to have a garbage collection system which performs accurate garbage collection concurrently with program execution, and which does not require double the usable memory space to operate. The new system should further provide good compaction of allocated memory, and be substantially non-intrusive with regard to program execution.

BRIEF SUMMARY OF THE INVENTION

In accordance with principles of the invention, a system for garbage collection is disclosed which substantially addresses the shortcomings of prior systems. In the disclosed system, memory that has been allocated to a program is reclaimed by first identifying those variables containing pointers (also referred to as "pointers", "pointer variables", "references" or "reference variables") which point to objects stored in a selected subset of memory. Indications of such pointers are stored in a data structure. Identification of the relevant pointers, as well as addition of their identities to the data structure, may be performed concurrently with execution of the program. Concurrently with these steps, a write barrier marks regions of memory in which one or more pointers have been modified by the program. The write barrier operates, for example, by setting "dirty" bits in a "card table" having entries corresponding to a number of predefined memory regions. Alternatively, the write barrier may store time stamps indicating the last time any pointer in the corresponding region was modified.

Also while the program is executing, a number of locations outside the subset of memory are identified which will later be used to store the objects located in the subset of memory.

Execution of the program is then suspended. The memory regions marked as "dirty" are examined to identify any further variables pointing to objects located in the subset of memory. Indications of any such pointers are added to the data structure. Those variables indicated by the data structure are then examined to determine whether they continue to point to objects within the subset of memory. Those that continue to do so are modified to point to corresponding locations outside of the subset of memory. The objects are then copied to the locations outside of the subset of memory, and the program is restarted.

The subset of memory in which the relocated objects were stored can now be added to a free list for reallocation. The subset of memory can be selected such that a large portion of contiguous memory space results when the memory objects within it are deallocated. In this way a significant amount of compaction can be accomplished, thus enabling the system to subsequently satisfy large memory allocation requests.

Depending on the specifics of a particular implementation, the set of relocated objects may be all or less than all of the objects in the memory subset. Where the relocated objects are less than all the objects stored within the subset of memory, the deallocated memory which is returned to the free list is that memory which was used to store the relocated objects.

In addition, a majority of the processing required by the system takes place concurrently with program execution, thus limiting the time the program must be stopped while garbage collection takes place. Moreover, the time the system must execute non-concurrently can be controlled by limiting the size of the subset of memory and/or the number and size of the relocated objects. The present system may, for example, be used to efficiently garbage-collect the relatively large "old" generation of objects in a generational garbage collection scheme.

BRIEF DESCRIPTION OF THE SEVERAL VIEWS OF THE DRAWING

The invention will be more fully understood by reference to the following detailed description of the invention in conjunction with the drawings, of which.

DETAILED DESCRIPTION OF THE INVENTION

Figure 1:
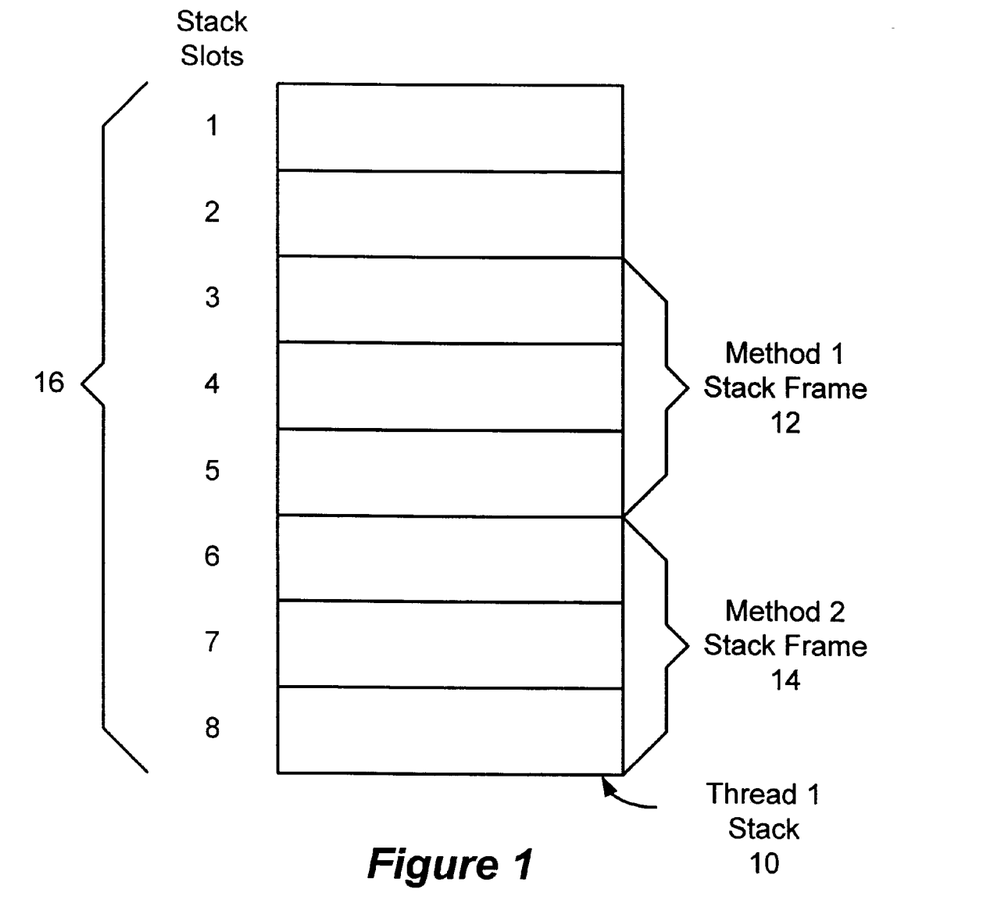
FIG. 1 illustrates an execution stack.

FIG. 1 shows an execution stack 10 for a thread, including a number of stack slots 16, numbered 1–8 for purposes of illustration. The stack 10 is shown including a stack frame 12 for a first method and a stack frame 14 for a second method. The term "method", as used herein, refers generally to a program segment, and is consistent with the use of that term in connection with the Java programming language developed by Sun Microsystems.

However, it will be recognized that the presently disclosed system may be applied also to other programming languages. Accordingly, the program segments referred to herein as "methods" are intended to denote any form of procedural abstraction. Various programming languages and environments may refer to such procedural abstractions by various names. For example, C has "functions", C++ has "functions" and "virtual functions", and PASCAL has "procedures".

During execution of a program in a multi-threaded runtime environment such as provided by the Java virtual machine developed by Sun Microsystems, each execution thread has its own stack. When the thread invokes a method, a stack frame, such as stack frame 12 or stack frame 14, is pushed onto the top of the stack. Returning from a method causes the stack frame at the top of the stack to be popped from the stack and discarded.

Each stack frame includes space for local variables for the associated method invocation. Information in the stack is stored in the stack slots 16, which, for example correspond to memory words stored in the underlying hardware system.

Figure 2:
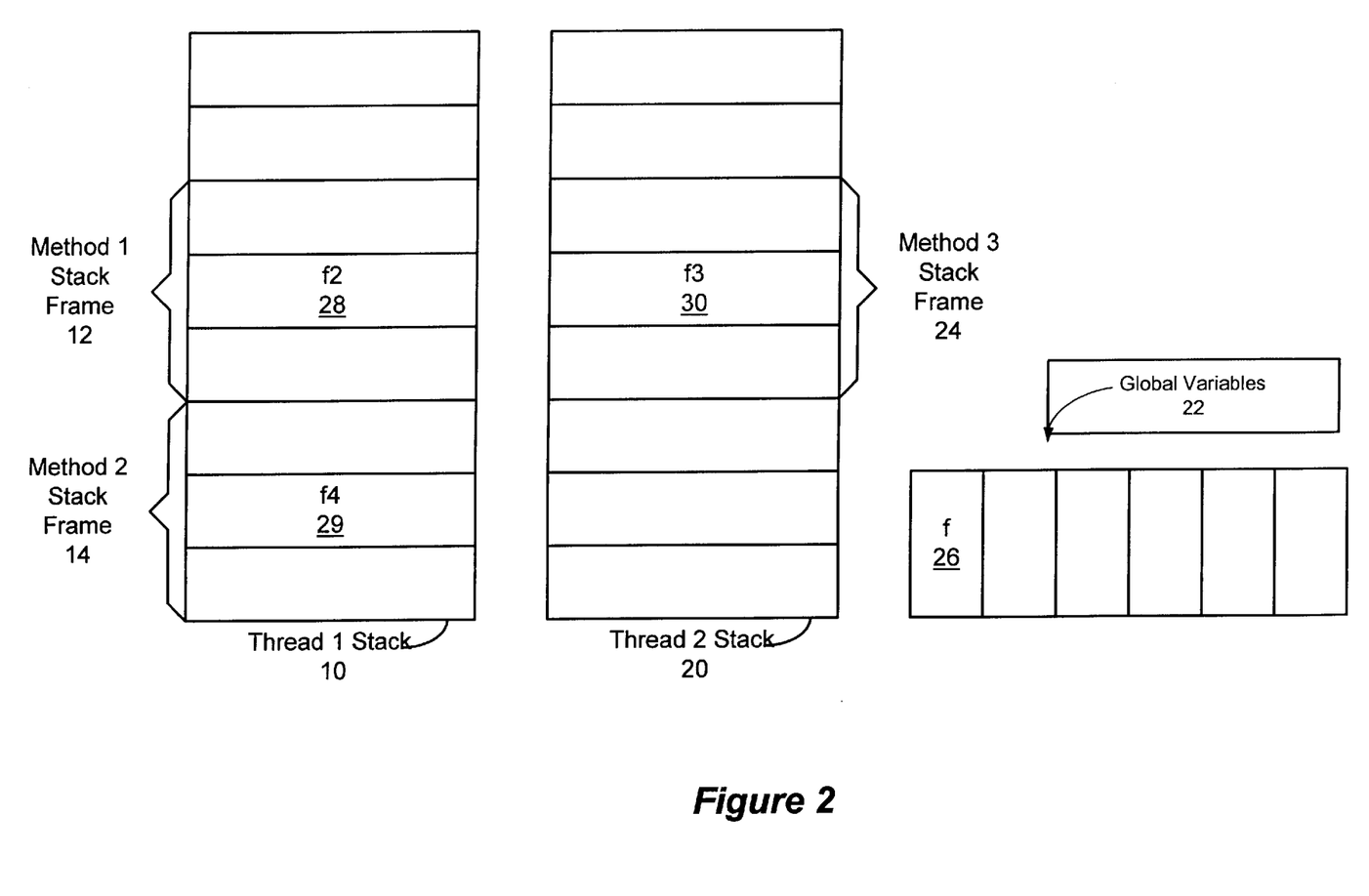
FIG. 2 illustrates two execution stacks and a set of global variables.

FIG. 2 shows the stack 10 of FIG. 1, as well as a stack 20 of a second thread, and a set of global variables 22, including a global variable f 26. The stack 10 is shown including stack frames 12 and 14 for method 1 and method 2, respectively, as invoked in thread 1, and a stack frame 24 for a method 3 as invoked in thread 2. The stack frame 12 is shown including a local variable f2 28. The stack frame 14 is shown including a local variable f4 29, and stack frame 24 is shown including a local variable f3 30. During execution of a program in a multi-threaded environment as shown in FIG. 2, the variables f 26, f2 28, f3 30, and f4 29 may be referred to as members of a "root set" of pointers, or as "root variables". The root set of pointers includes those contained in the thread execution stacks, together with any global pointer variables for a given program. An important property from the perspective of a garbage collection system is that dynamically allocated storage cannot be used unless it can be reached by starting at the root set and finding all objects either directly or indirectly pointed to by the root set. Storage that is not reachable in this way can never again be referenced by the program, and thus may be recycled.

To locate all currently allocated dynamic storage, objects pointed to by the root set are checked to see if they include any pointers, and any objects referred to by such pointers are followed to determine a next level of pointers, and so on through all subsequent pointer levels. In this way, the set of dynamically allocated memory objects that are currently in use may be determined by traversing a tree of pointers beginning with the set of root variables.

Figure 3:
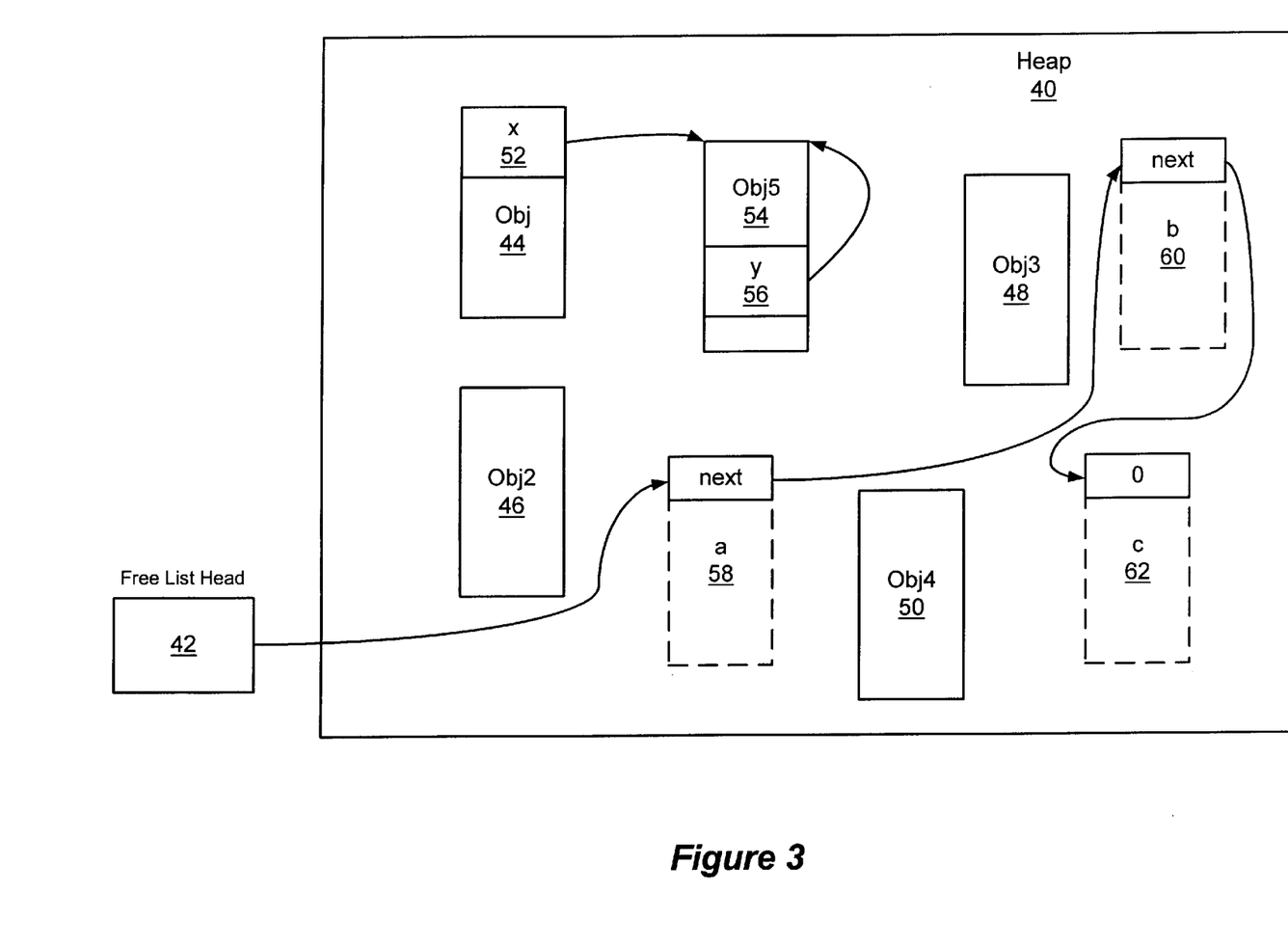
FIG. 3 illustrates an object heap and a free list.

FIG. 3 shows an object heap 40 and a free list indicated by a free list head 42. The object heap 40 is a data structure including indication of all dynamically allocatable memory. In execution environments for many programming languages, all dynamic memory allocation is done from the object heap. For example, in the Java runtime environment, dynamic memory is allocated as objects, and all object allocation is done from the heap. The free list indicated by free list head 42 is an example of a data structure indicating all memory objects in the heap 40 which are available for allocation. Thus, all available memory within the heap 40 is indicated by entries on the free list.

In FIG. 3, free list head 42 indicates a linked list shown including allocatable memory objects a 58, b 60 and c 62, respectively. The free list of FIG. 3 is shown for purposes of example as a linked list, wherein each memory object within the free list includes a pointer to a next memory object in the free list, and where the last memory object in the free list includes a next pointer value of 0. Requests for dynamic memory allocation would be satisfied by allocation of memory from one or more memory objects in the free list indicated by free list head 42, such as from within one of memory objects a 58, b 60, or c 62. Also shown in the heap 40 of FIG. 3 are objects obj 44, obj2 46, obj3 48, obj4 50, and obj5 54. The objects obj 44, obj2 46, obj3 48 and obj4 50 are for purposes of illustration pointed to by the root pointers f 26, f2 28, f3 30 and f4 29 shown in FIG. 2. Further in FIG. 3, the object obj 44 is shown including a pointer x 52 which points to the object obj5 54. The object obj5 54 is shown including a pointer y 56 back to itself. While the illustrative 10 embodiment of FIG. 3 shows a free list for managing the available memory within the heap, alternative embodiments may use other specific structures for this purpose. For example, multiple lists may be used to organize the free space segments according to their sizes. Alternatively, a tree structure or binary-buddy system may be employed.

Figure 4:
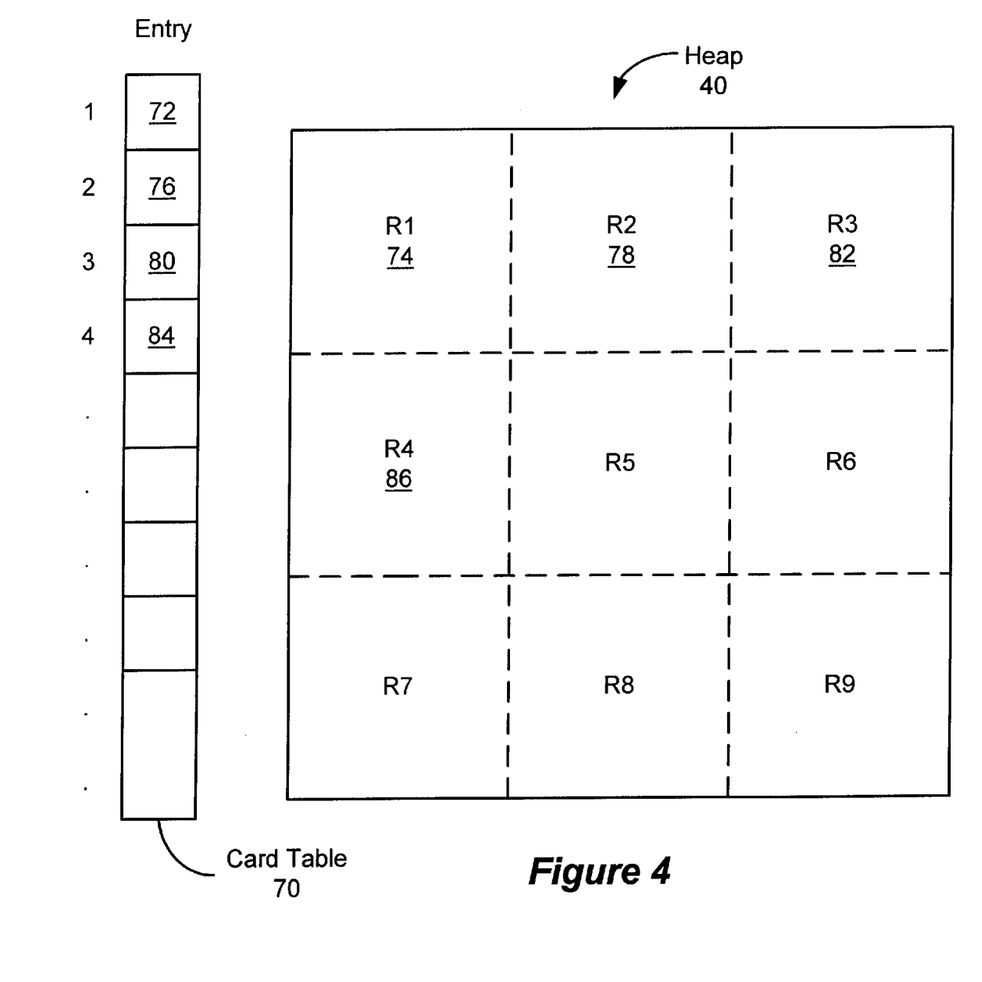
FIG. 4 illustrates an object heap and a card table data structure.

FIG. 4 shows an object heap 40 and a data structure 70 referred to as a "card table". The card table 70 includes entries associated with memory regions within the heap 40. Specifically, entry 1 72 is associated with region R1 74, entry 2 76 is associated with region R2 78, entry 3 80 is associated with region R3 82, entry 4 84 is associated with region R4 86, etc. Each entry in the card table 70 includes information regarding the memory region it is associated with. For example, a card table entry may include a dirty bit, which when set indicates that one or more pointers within the associated memory region have been modified since the dirty bit was last cleared. Other information that may be stored in a card table entry includes time stamps reflecting a time at which a pointer in the associated region was last modified. It will be understood by those skilled in the art that the dirty bits referred to herein may alternatively be implemented using a flag or other similar type of variable or object that is capable of reflecting the dirty (set) and not-dirty (clear) states.

In one embodiment, the dirty bits of the card table are implemented using the memory management hardware of the underlying system. For example, an underlying system may operate using page tables having entries which include information associated with corresponding memory pages. The page table entries may include a "dirty" bit, indicating, when set, that one or more locations within the corresponding memory page has been modified since the last time the bit was cleared. In such systems, the card table may be implemented using such memory page dirty bits of the underlying virtual memory system. In another embodiment, a compiler generating machine code for an operation that updates a pointer field in an object generates code that not only accomplishes the update, but also modifies the card table entry corresponding to the location of the modified pointer to indicate that the modification has occurred.

Figure 5:
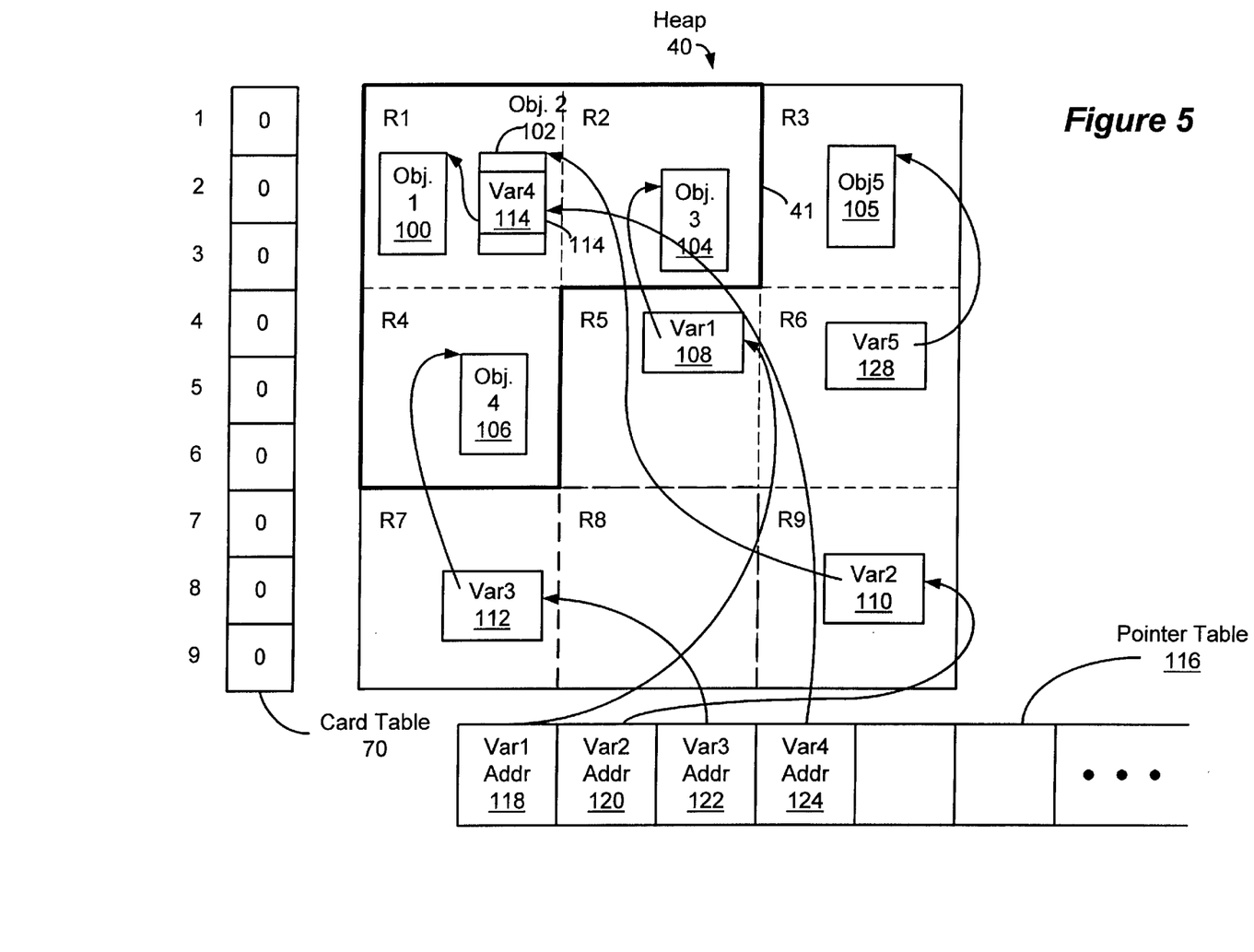
FIG. 5 illustrates an object heap, a card table and a pointer table including indications of pointers in a first set of pointers to a selected set of objects in a subset of memory.

FIG. 5 shows an object heap 40, together with a card table 70 and a pointer table 116. The heap 40 is shown including a subset of memory 41 consisting of memory regions R1, R2, and R4. The card table 70 is shown storing zero in each of its entries, as it would following initialization. The pointer table 116 is shown including a number of entries, specifically an entry Var1 Addr 118 storing an address of a pointer Var1 108, an entry Var2 Addr 120 storing an address of a pointer Var2 110, an entry Var3 Addr 122 storing an address of a pointer Var3 112, and an entry Var4 Addr 124 storing an address of a pointer Var4 114. As illustrated in FIG. 5, each of the pointer addresses stored by an entry in the pointer table 116 is a pointer to a location containing a pointer into the subset of memory 41. In FIG. 5, Var5 128 does not contain a pointer into the subset of memory 41, and accordingly is not added to the pointer table 116. Thus, during operation of the presently disclosed garbage collection system, a record of pointers into memory locations within the subset of memory 41 is kept using the pointer table 116. While FIG. 5 shows a single pointer table 116, alternative embodiments may provide separate pointer tables for multiple memory regions. Further, while FIG. 5 shows an embodiment of the pointer table using an array data structure for storing pointer addresses, an alternative embodiment may employ a data structure indicating memory regions which include the pointers of interest.

Figure 6:
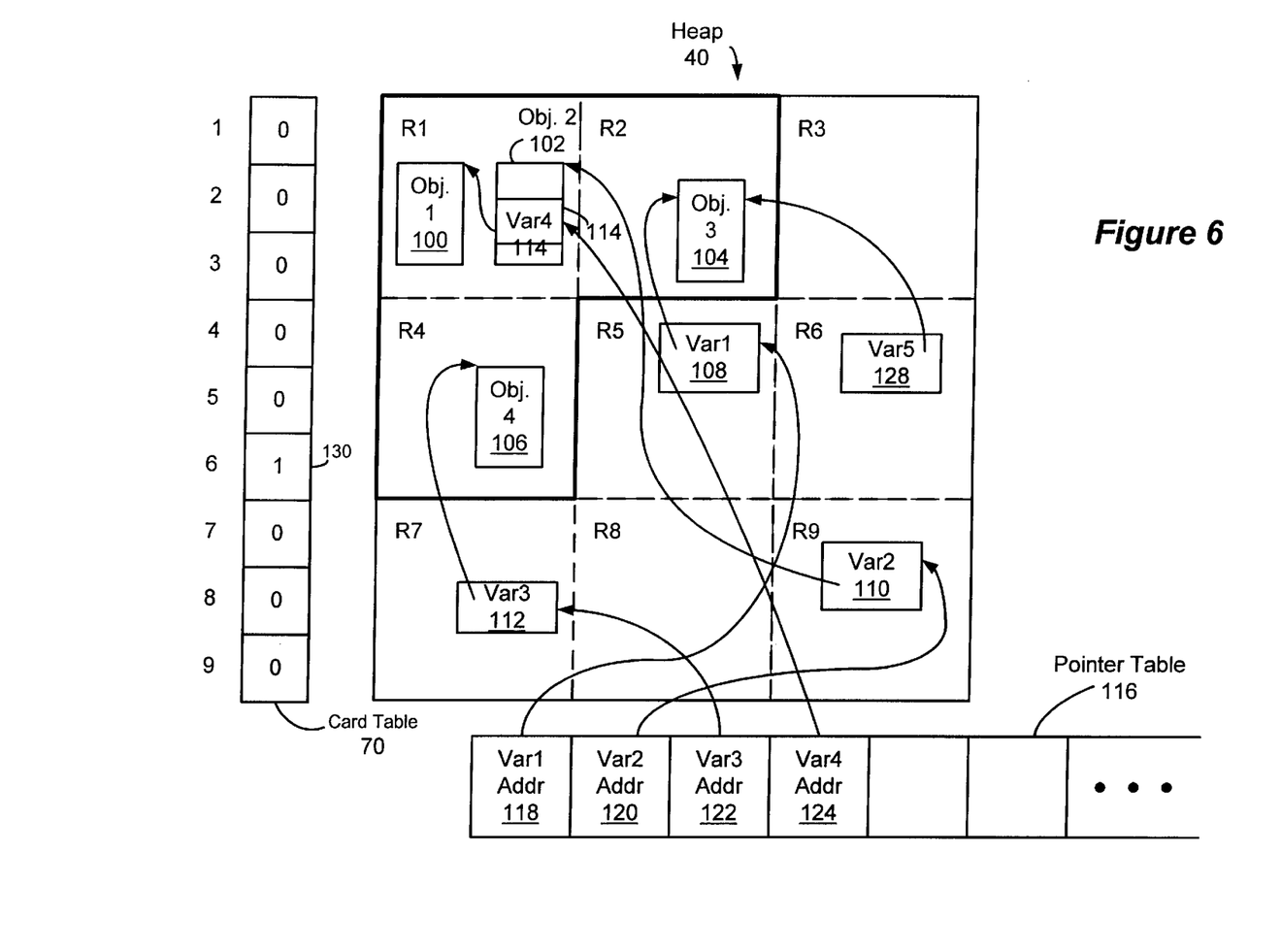
FIG. 6 illustrates an object heap and a card table indicating modification of a pointer within a region of memory.

FIG. 6 shows the object heap 40, card table 70 and pointer table 116 of FIG. 5, where the entry 6 130 in the card table 70 includes a dirty bit set to 1 to indicate that a variable in the associated memory region R6, in this case pointer Var5 128, has been modified by the executing program since the dirty bits in the card table 70 were last initialized.

Figure 7:
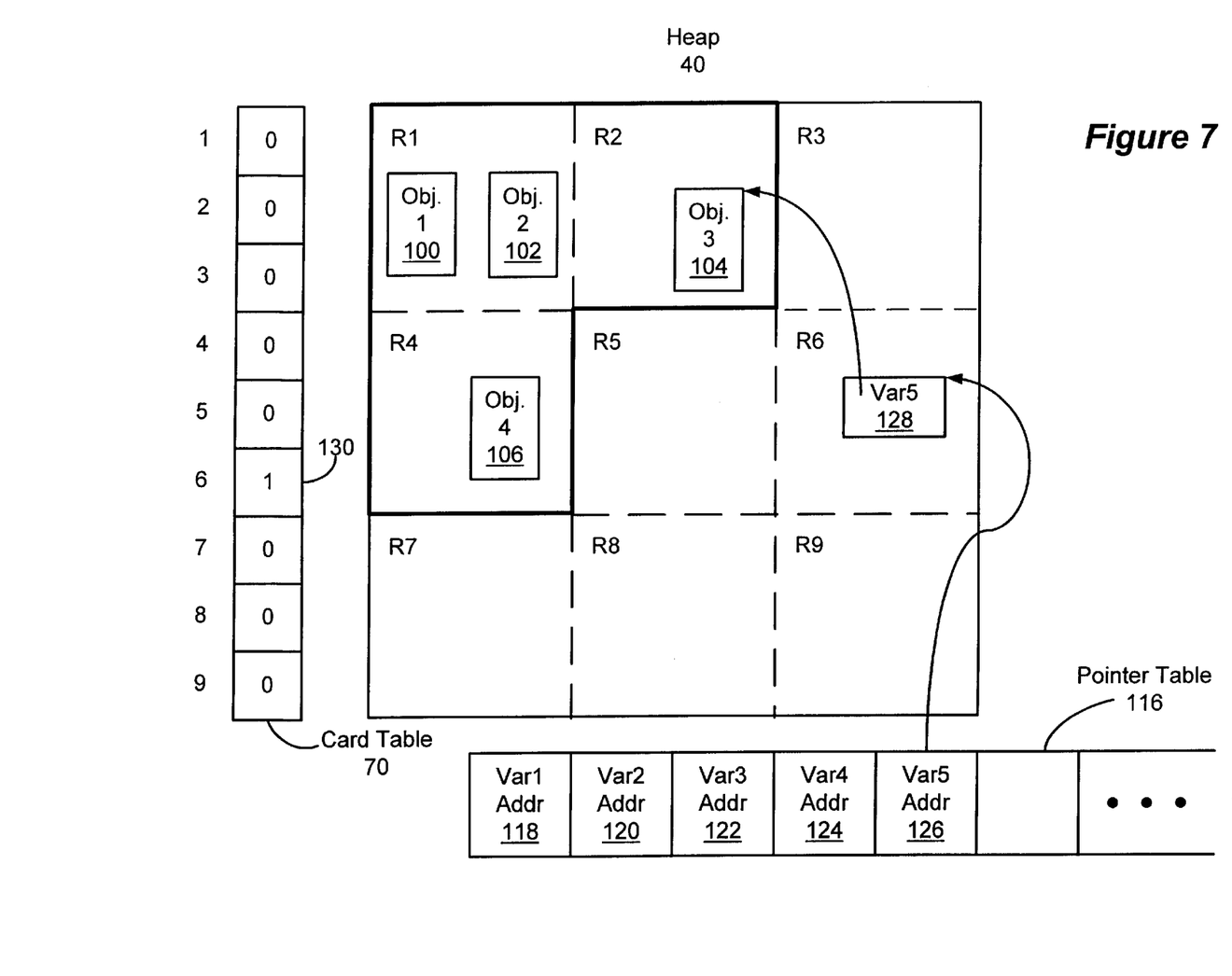
FIG. 7 illustrates an object heap, a card table and a pointer table including indication of a pointer to one of a selected set of objects in a subset of memory.

In FIG. 7, the heap 40, card table 70, and pointer table 116 shown in claim 6 are shown again, but with the pointer table 116 having been modified to include an entry 126 storing an indication of the pointer of Var5 128. Modification of the pointer table 116 as shown in FIG. 7 is for example in response to subsequent detection of the set dirty bit in entry 6 130 of the card table, and determination that the pointer Var5 128 has been modified to point to a location within the subset of memory 41. Arrows indicating the relationships between the elements of FIG. 7 other than pointer table entry 126, Var5 128 and object 3 104 are omitted for clarity.

Figure 8:
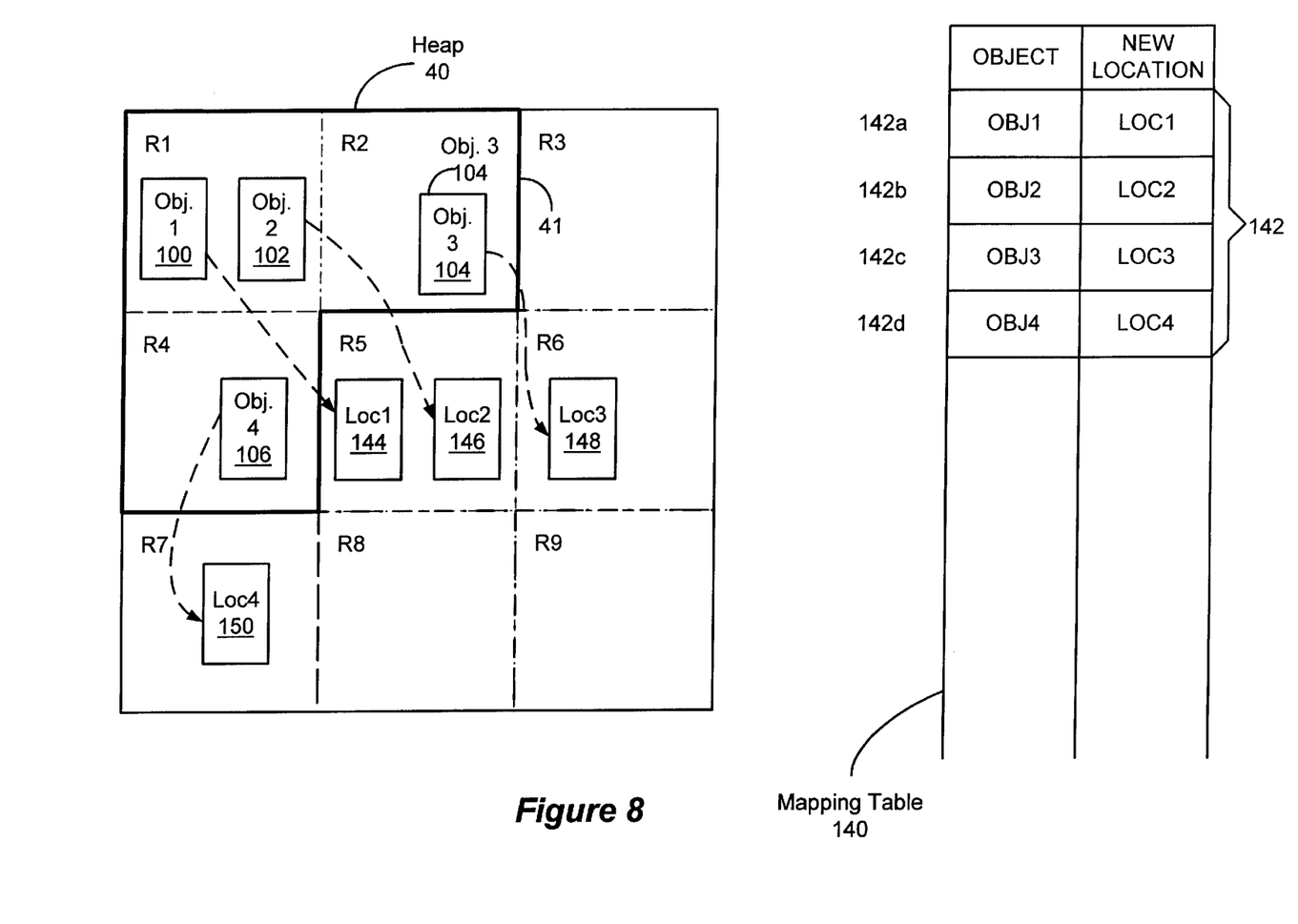
FIG. 8 illustrates an object heap including a number of memory locations outside the subset of memory for storing the selected set of objects, together with a mapping table.

FIG. 8 shows the object heap 40 together with a mapping table 140. The mapping table 140 includes a number of entries 142. Each entry in the mapping table 140 includes an association between an object within the memory subset 41 and a corresponding memory location outside the subset of memory 41. Specifically, mapping table entry 142a includes an association between object 1 100 and location 1 144, entry 142b includes an association between object 2 102 and location 2 146, entry 142c includes an association between object 3 104 and location 3 148, and entry 142d includes an association between object 4 106 and location 4 150. During operation of the presently disclosed garbage collection system, the mapping table is used to relocate objects within the subset of memory 41 to locations outside the subset of memory, and to update pointers to objects within the subset of memory 41 to refer to their proper addresses after this relocation.

Figure 9:
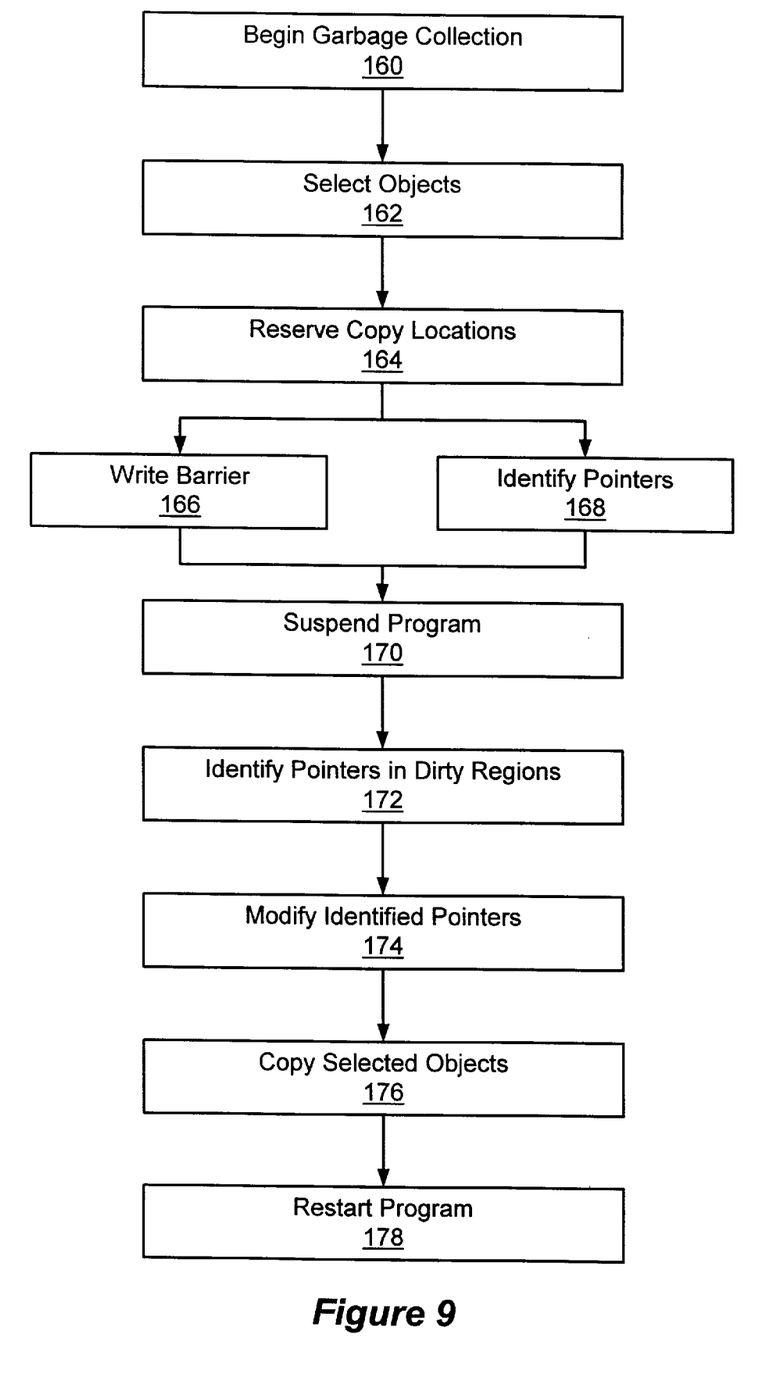
FIG. 9 is a flow chart showing steps performed by an illustrative embodiment of the disclosed system.

FIG. 9 is a flow chart showing steps performed by an exemplary embodiment of the disclosed garbage collection system. At step 160 the garbage collection system is initiated, for example in response to a triggering event. For example, the memory management system may detect that insufficient contiguous memory is available to satisfy a large allocation request. Alternatively, garbage collection could be triggered periodically to ensure that memory fragmentation is regularly reduced.

At step 162, the garbage collection system selects a set of allocated objects. The selected objects are objects which are currently in use, as may be determined by traversing the objects which are directly or indirectly reachable from the set of root variables. The selected objects may be all objects in use that are located within a selected subset of memory, or some subset of those objects. At step 164, the garbage collection system reserves a number of locations outside the subset of memory to be used to store the selected objects. The garbage collection system reserves these locations such that they cannot be allocated. Associations between specific reserved locations and specific objects within the subset of memory may be established and maintained through the use of the mapping table 140 shown in FIG. 8.

Steps 166 and 168 may be performed substantially concurrently. Step 166 represents a write barrier which intercepts all modifications of pointers by the program. In a first embodiment, when such a modification is detected, the write barrier 166 records an indication of such modification in the card table entry corresponding to the region in which the modified pointer is located. The indication may consist of setting a dirty bit, or recording a time stamp reflecting the time of the modification. In an alternative embodiment, the write barrier only records modifications of pointers which point to locations within the subset of memory after being modified.

Concurrently with the write barrier 166, at step 168 the garbage collection system identifies those variables which point to locations within the subset of memory. Indication of each such pointer may be stored, for example, in a pointer table, such as shown in FIG. 7.

While steps 160, 162, 164, 166 and 168 may be performed concurrently with the executing program, at step 170, execution of the program is suspended. At step 172, following suspension of execution of the program, the garbage collection system reexamines the memory regions which the card table indicates include modified pointers in order to determine whether any such pointers remain pointing to objects within the subset of memory. This step ensures that any pointers to the selected objects which were not detected at step 168 are found and their identities recorded, for example in the pointer table 116 as shown in FIG. 7. This could happen, for example, if some location L did not contain a pointer into the subset of memory when step 168 examined it, but subsequently came to hold such a pointer via modification of L by the executing program.

At step 174, the garbage collection system modifies those pointers identified in steps 168 and 172 to point to locations outside the subset memory to which the objects within the subset of memory are copied at step 176. At step 178, the program is restarted.

After step 176 is performed, the subset of memory may be returned to the free list for subsequent allocation. Because all memory objects within the memory subset that were in use were copied out of the memory subset, the whole memory subset can be reused. In this way, a relatively large, contiguous area of free space may be formed for future allocation. Alternatively, where only a subset of the in-use objects could be successfully copied, then only space occupied by objects that were copied, in addition to any unused space, is added to the free-list.

Those skilled in the art should readily appreciate that the programs defining the functions of the present invention can be delivered to a computer in many forms; including , but not limited to: (a) information permanently stored on non-writable storage media (e.g. read only memory devices within a computer such as ROM or CD-ROM disks readable by a computer I/O attachment); (b) information alterably stored on writable storage media (e.g. floppy disks and hard drives); or (c) information conveyed to a computer through communication media for example using baseband signaling or broadband signaling techniques, including carrier wave signaling techniques, such as over computer or telephone networks via a modem. In addition, while the invention may be embodied in computer software, the functions necessary to implement the invention may alternatively be embodied in part or in whole using hardware components such as Application Specific Integrated Circuits or other hardware, or some combination of hardware components and software.

While the invention is described through the above exemplary embodiments, it will be understood by those of ordinary skill in the art that modification to and variation of the illustrated embodiments may be made without departing from the inventive concepts herein disclosed. Specifically, while the preferred embodiments are disclosed with reference to the Java programming language, the present invention is generally applicable to any other programming languages and environments in which garbage collection is performed. Moreover, while the preferred embodiments are described in connection with various illustrative data structures, one skilled in the art will recognize that the system may be embodied using a variety of specific data structures. Accordingly, the invention should not be viewed as limited except by the scope and spirit of the appended claims.

What is claimed is:

1. A method for relocating objects allocated to a program, comprising:

marking regions of memory in which a pointer is modified by said program, concurrent with execution of said program;

identifying a first set of variables pointing to objects in a subset of memory, concurrent with execution of said program;

suspending execution of said program;

identifying, while said execution of said program is suspended, a second set of variables pointing to said objects in said subset of memory, said second set of variables contained in said marked regions of memory;

modifying, while said execution of said program is suspended, said first set of variables and said second set of variables to point to locations outside of said subset of memory;

copying, while said execution of said program is suspended, said objects in said subset of memory to said locations outside of said subset of memory; and restarting execution of said program.

2. The method of claim 1, further comprising adding indications of addresses of variables in said first set of variables to a data structure, concurrent with execution of said program.

3. The method of claim 2, further comprising adding indications of addresses of variables in said second set of variables to said data structure.

4. The method of claim 2, wherein said data structure is an array.

5. The method of claim 1, further comprising selecting said locations outside of said subset of memory concurrent with execution of said program.

6. The method of claim 1, further comprising forming a mapping table for associating locations of said objects in said subset of memory with corresponding ones of said locations outside of said subset of memory, concurrent with execution of said program.

7. The method of claim 1, further comprising confirming, responsive to said suspending execution of said program, that ones of said first set of variables still point to said objects in said subset of memory prior to said steps of modifying and copying.

8. The method of claim 1, wherein said memory is divided into a plurality of regions, each one of said regions associated with an entry in a table, each entry in said table capable of indicating whether the region it is associated with has been modified.

9. The method of claim 8, wherein each said entry in said table includes a time stamp indicating a time that a pointer in the region associated with said entry was last modified.

10. The method of claim 1 wherein said step of marking regions of memory in which a pointer is modified by said program is performed by a write barrier routine.

11. The method of claim 10, wherein said write barrier routine executes when said program modifies a pointer.

12. The method of claim 1, further comprising returning, responsive to said copying, said subset of memory to a free list.

13. The method of claim 1, wherein said objects in said subset of memory are in use.

14. The method of claim 1, wherein said objects in said subset of memory are the set of objects in said subset of memory that are in use.

15. A system for relocating objects allocated to a program, said system including a computer readable memory having one or more computer instructions stored thereon, said instructions comprising:

instructions operative to mark regions of memory in which a pointer is modified by said program, concurrent with execution of said program;

instructions operative to identify a first set of variables pointing to objects in a subset of memory, concurrent with execution of said program;

instructions operative to suspend execution of said program;

instructions operative to identify, while said execution of said program is suspended, a second set of variables pointing to said objects in said subset of memory, said second set of variables contained in said marked regions of memory;

instructions operative to modify, while said execution of said program is suspended, said first set of variables and said second set of variables to point to locations outside of said subset of memory;

instructions operative to copy, while said execution of said program is suspended, said objects in said subset of memory to said locations outside of said subset of memory; and instructions operative to restart execution of said program.

16. The system of claim 15, said instructions further comprising instructions operative to add indications of addresses of variables in said first set of variables to a data structure, concurrent with execution of said program.

17. The system of claim 16, said instructions further comprising instructions operative to add indications of addresses of variables in said second set of variables to said data structure.

18. The system of claim 15, wherein said data structure is an array.

19. The system of claim 15, said instructions further comprising instructions operative to select said locations outside of said subset of memory concurrent with execution of said program.

20. The system of claim 15, said instructions further comprising instructions operative to form a mapping table for associating locations of said objects in said subset of memory with corresponding ones of said locations outside of said subset of memory, concurrent with execution of said program.

21. The system of claim 15, said instructions further comprising instructions operative to confirm, responsive to said suspending execution of said program, that ones of said first set of variables still point to said objects in said subset of memory prior to said steps of modifying and copying.

22. The system of claim 15, wherein said memory is divided into a plurality of regions, each one of said regions associated with an entry in a table, each entry in said table capable of indicating whether the region it is associated with has been modified.

23. The system of claim 22, wherein each said entry in said table includes a time stamp indicating a time that a pointer in the region associated with said entry was last modified.

24. The system of claim 15 wherein said instructions operative to mark regions of memory in which a pointer is modified by said program are included within a write barrier routine.

25. The system of claim 24, wherein said write barrier routine is operative to execute when said program modifies a pointer.

26. The system of claim 15, said instructions further comprising instructions operative to return, responsive to said instructions operative to copy said objects in said subset of memory to said locations outside of said subset of memory, said subset of memory to a free list.

27. The system of claim 15, wherein said objects in said subset of memory are in use.

28. The system of claim 15, wherein said objects in said subset of memory are the set of objects in said subset of memory that are in use.

29. A computer program product including a computer readable medium, said computer readable medium having a computer program stored thereon, said program for relocating objects allocated to a user program, said program comprising:
   program code for marking regions of memory in which a pointer is modified by said user program, concurrent with execution of said user program;
   program code for identifying a first set of variables pointing to objects in a subset of memory, concurrent with execution of said user program;
   program code for suspending execution of said user program;
   program code for identifying, while said execution of said user program is suspended, a second set of variables pointing to said objects in said subset of memory, said second set of variables contained in said marked regions of memory;
   program code for modifying, while said execution of said user program is suspended, said first set of variables and said second set of variables to point to locations outside of said subset of memory;
   program code for copying, while said execution of said user program is suspended, said objects in said subset of memory to said locations outside of said subset of memory; and
   program code for restarting execution of said user program.

30. The computer program product of claim 29, said program further comprising program code for adding indications of addresses of variables in said first set of variables to a data structure, concurrent with execution of said user program.

31. The computer program product of claim 30, said program further comprising program code for adding indications of addresses of variables in said second set of variables to said data structure.

32. The computer program product of claim 29, wherein said data structure is a list.

33. The computer program product of claim 29, said program further comprising program code for selecting said locations outside of said subset of memory concurrent wit caution of said user program.

34. The computer program product of claim 29, said program further comprising program code for forming a mapping table for associating locations of said objects in said subset of memory with corresponding ones of said locations outside of said subset of memory, concurrent with execution of said user program.

35. The computer program product of claim 29, said program further comprising program code for confirming, responsive to said suspending execution of said user program, that ones of said first set of variables still point to said objects in said subset of memory prior to said modifying said first set of variables and said second set of variables to point to locations outside of said subset of memory and said copying said objects in said subset of memory to said locations outside of said subset of memory.

36. The computer program product of claim 29, wherein said memory is divided into a plurality of regions, each one of said regions associated with an entry in a table, each entry in said table capable of indicating whether the region it is associated with has been modified.

37. The computer program product of claim 36, wherein each said entry in said table includes a time stamp indicating a time that a pointer in the region associated with said entry was last modified.

38. The computer program product of claim 29 wherein said program code for marking regions of memory in which a pointer is modified by said user program are included within a write barrier routine.

39. The computer program product of claim 38, wherein said write barrier routine is operative to execute when said user program modifies a pointer.

40. The computer program product of claim 29, said program further comprising program code for returning, responsive to said program code for copying said objects in said subset of memory to said locations outside of said subset of memory, said subset of memory to a free list.

41. The computer program product of claim 29, wherein said objects in said subset of memory are in use.

42. The computer program product of claim 29, wherein said objects in said subset of memory are the set of objects in said subset of memory that are in use.

43. A computer data signal embodied in a carrier wave, said computer data signal including a computer program, said computer program for relocating objects allocated to a user program, said computer program comprising:
   program code for marking regions of memory in which a pointer is modified by said user program, concurrent with execution of said user program;
   program code for identifying a first set of variables pointing to objects in a subset of memory, concurrent with execution of said user program;
   program code for suspending execution of said user program;

program code for identifying, while said execution of said user program is suspended, a second set of variables pointing to said objects in said subset of memory, said second set of variables contained in said marked regions of memory;

program code for modifying, while said execution of said user program is suspended, said first set of variables and said second set of variables to point to locations outside of said subset of memory;

program code for copying, while said execution of said user program is suspended, said objects in said subset of memory to said locations outside of said subset of memory; and program code for restarting execution of said user program.

44. A system for relocating objects allocated to a user program, comprising:

means for marking regions of memory in which a pointer is modified by said user program, concurrent with execution of said user program;

means for identifying a first set of variables pointing to objects in a subset of memory, concurrent with execution of said user program;

means for suspending execution of said user program;

means for identifying, while said execution of said user program is suspended, a second set of variables pointing to said objects in said subset of memory, said second set of variables contained in said marked regions of memory;

means for modifying, while said execution of said user program is suspended, said first set of variables and said second set of variables to point to locations outside of said subset of memory;

means for copying, while said execution of said user program is suspended, said objects in said subset of memory to said locations outside of said subset of memory; and means for restarting execution of said user program.

* * * * *

UNITED STATES PATENT AND TRADEMARK OFFICE
CERTIFICATE OF CORRECTION

PATENT NO. : 6,249,793 B1
DATED : June 19, 2001
INVENTOR(S) : Antonios Printezis et al.

It is certified that error appears in the above-identified patent and that said Letters Patent is hereby corrected as shown below:

Column 1,
Line 27, "malloc" should read -- Malloc ( ) --;

Column 6,
Line 24, delete "10";

Column 12,
Line 14, "wit" should read -- with --; and
Line 15, "caution" should read -- execution --.

Signed and Sealed this

Fourth Day of June, 2002

Attest:

Attesting Officer

JAMES E. ROGAN
Director of the United States Patent and Trademark Office